United States Patent
Bergman et al.

(10) Patent No.: US 7,870,053 B1
(45) Date of Patent: Jan. 11, 2011

(54) APPARATUS AND METHODS FOR AUCTIONING TIME AND DESKTOP SPACE TO PRODUCT AND SERVICE SUPPLIERS

(75) Inventors: Lawrence Bergman, Mt. Kisco, NY (US); Yuan-Chi Chang, White Plains, NY (US); Richard Han, New York, NY (US); Chung-Sheng Li, Ossining, NY (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 2823 days.

(21) Appl. No.: 09/670,446

(22) Filed: Sep. 26, 2000

(51) Int. Cl.
*G06Q 40/00* (2006.01)
(52) U.S. Cl. .......................... 705/37; 705/26
(58) Field of Classification Search ................ 705/14.4, 705/14.41, 14.54, 14.49, 26, 27, 37
See application file for complete search history.

(56) References Cited

U.S. PATENT DOCUMENTS

| | | | | |
|---|---|---|---|---|
| 5,948,061 | A | * | 9/1999 | Merriman et al. ........... 709/219 |
| 6,131,086 | A | * | 10/2000 | Walker ......................... 705/26 |
| 774,473 | A | | 1/2001 | Edlering |
| 6,216,129 | B1 | | 4/2001 | Eldering ....................... 707/4 |
| 6,236,990 | B1 | * | 5/2001 | Geller ........................... 707/5 |
| 6,598,026 | B1 | * | 7/2003 | Ojha ........................... 705/26 |

FOREIGN PATENT DOCUMENTS

| | | |
|---|---|---|
| WO | 0033160 | 12/1999 |
| WO | 0033228 | 12/1999 |
| WO | 0033233 | 12/1999 |
| WO | 0064165 | 4/2000 |
| WO | 0069163 | 5/2000 |
| WO | 0033163 | 6/2000 |
| WO | 0130086 | 4/2001 |

* cited by examiner

*Primary Examiner*—Richard C Weisberger
(74) *Attorney, Agent, or Firm*—Yee & Associates, P.C.; Anne V. Dougherty (57) ABSTRACT

Apparatus and methods for auctioning time and desktop space to product and service suppliers are provided. The apparatus and methods obtain bids from various product and service suppliers and determine which of the bids are the highest ranking bids. The particular product and service suppliers from which bids are obtained may be determined based on user preferences stored in a user profile, for example. Based on the ranking of the bids, commercial information from the product and/or service suppliers is presented to the user. Higher ranking bids are provided with larger display space on a user's client device display and are provided with a longer display time before cycling to the next lower ranking bid. In addition, multiple displays of commercial information may be provided at a same time with the size and duration of the displays being determined based on the ranking of the associated bid from the product/service supplier.

45 Claims, 4 Drawing Sheets

APPARATUS AND METHODS FOR AUCTIONING TIME AND DESKTOP SPACE TO PRODUCT AND SERVICE SUPPLIERS

BACKGROUND OF THE INVENTION

1. Technical Field

The present invention is directed to apparatus and methods for an individual user auctioning his/her time and desktop space to product and service suppliers. More particularly, the present invention provides apparatus and methods for obtaining bids from various product and service suppliers, determining which of the bids are the highest ranking bids, and presenting commercial information from the product and/or service suppliers in accordance with the ranking of the bids.

2. Description of Related Art

Various mechanisms have been devised for determining which advertisements and commercial information to be presented to a user on his/her client device. These mechanisms typically involve determining an advertisement to be displayed, such as a banner advertisement, based on user preferences stored, for example, in a user profile file. Based on the user profile, an advertisement meeting the interests of the user, as defined in the user profile, is selected and displayed to the user via the client device.

However, there is no mechanism by which a plurality of advertisements, or other commercial information, may be evaluated as to the commercial benefit being offered to the user. Moreover, a user does not directly participate in the selection of advertisements to filter out unwanted information, e.g., oil change advertising to a person who does not own a car. Furthermore, there is no mechanism by which the amount of space on the client device, e.g., visual space on the display, airtime on the cellular phone, or time duration of presentation of the commercial information may be dynamically determined. Rather, known systems present the selected advertisement constantly until the user selects a new display, e.g., a new web page, or cycle the advertisements at a predetermined cycle time.

Thus, it would be beneficial to have an apparatus and method for auctioning time and space allocations on a client output device to providers of commercial information.

SUMMARY OF THE INVENTION

The present invention provides apparatus and methods for auctioning time and desktop space to product and service suppliers. The apparatus and methods of the present invention obtain bids from various product and service suppliers and determine which of the bids are the highest ranking bids. The particular product and service suppliers from which bids are obtained may be determined based on user preferences stored in a user profile, for example.

Based on the ranking of the bids, commercial information from the product and/or service suppliers is presented to the user. Higher ranking bids are provided with larger display space on a user's client device display and are provided with a longer display time before cycling to the next lower ranking bid. In addition, multiple displays of commercial information may be provided at a same time with the size and duration of the displays being determined based on the ranking of the associated bid from the product/service supplier. Other features and advantages of the present invention will be described in, or will become apparent to those of ordinary skill in the art in view of, the following detailed description of the preferred embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
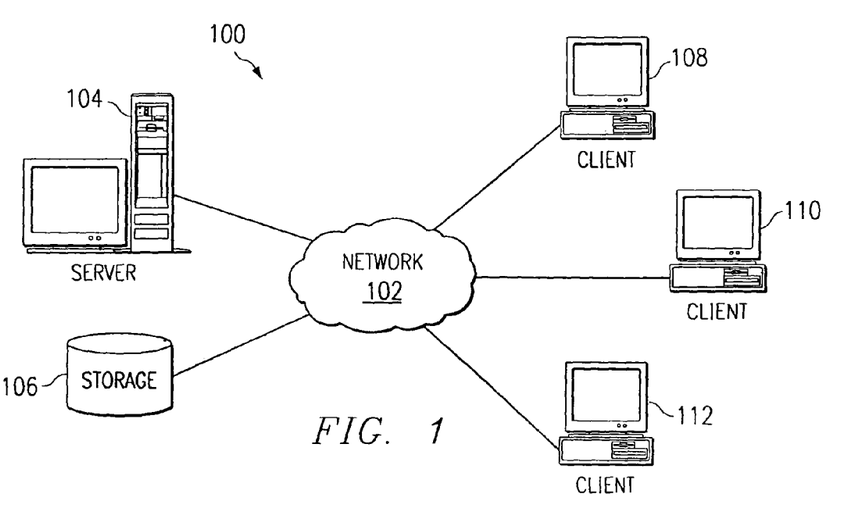
FIG. 1 is a diagram illustrating a distributed data processing system according to the present invention.

With reference now to the figures, and in particular with reference to FIG. 1, a pictorial representation of a distributed data processing system is depicted in which the present invention may be implemented. Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers, network computers, personal digital assistants, data network compatible cellular devices, cable or satellite TV set-top boxes, Internet ready game consoles, and the like. For purposes of this application, a network computer is any computer coupled to a network which receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, educational, and other computer systems that route data and messages. Of course, distributed data processing system 100 also may be implemented as a number of different types of networks such as, for example, an intranet or a local area network. FIG. 1 is intended as an example and not as an architectural limitation for the processes of the present invention.

Figure 2:
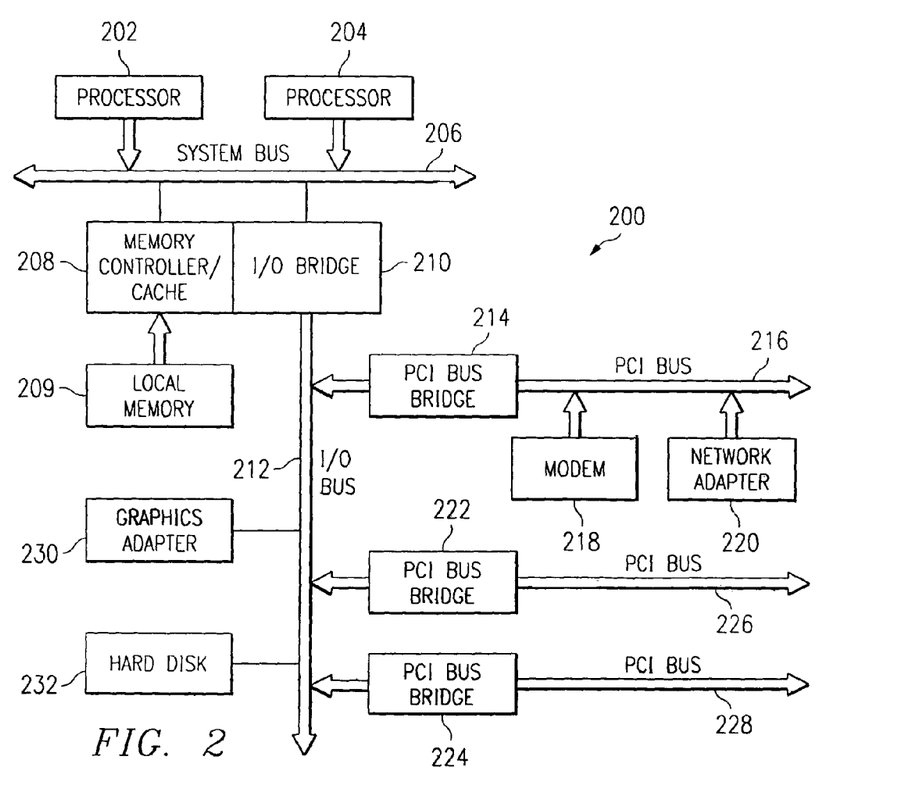
FIG. 2 is an exemplary block diagram of a server according to the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000, a product of International Business Machines Corporation in Armonk, N.Y., running the Advanced Interactive Executive (AIX) operating system.

Figure 3:
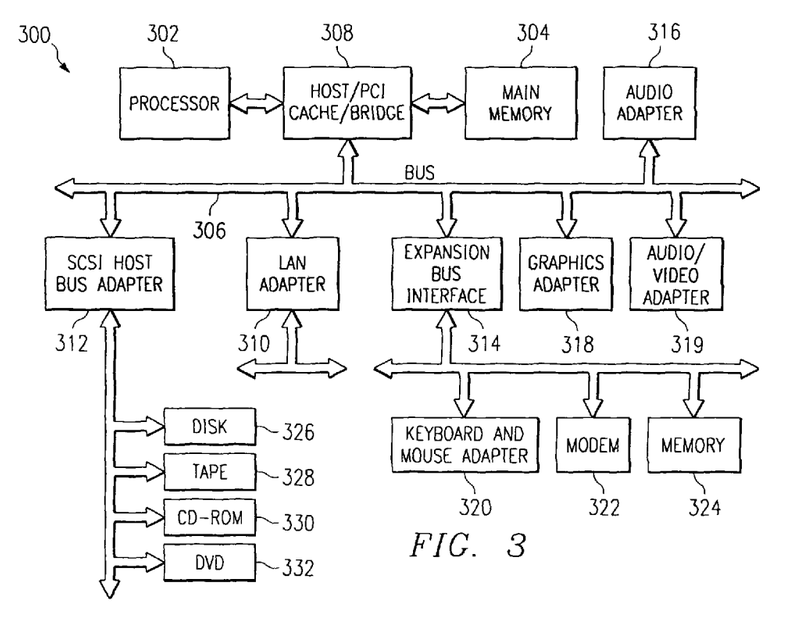
FIG. 3 is an exemplary block diagram of a client according to the present invention.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used.

Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation.

An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

The present invention provides an apparatus and method for determining which of a plurality of product/service suppliers are provided commercial space on a client device. The present invention further determines how much commercial space and time each product/service provider is provided based on ranking bids from the product/service providers. The functions of the present invention may be implemented in either a server, such as server 200, or a client device, such as client device 300. For purposes of illustration, the present invention will be described in terms of the functions being performed in a client device.

Figure 4:
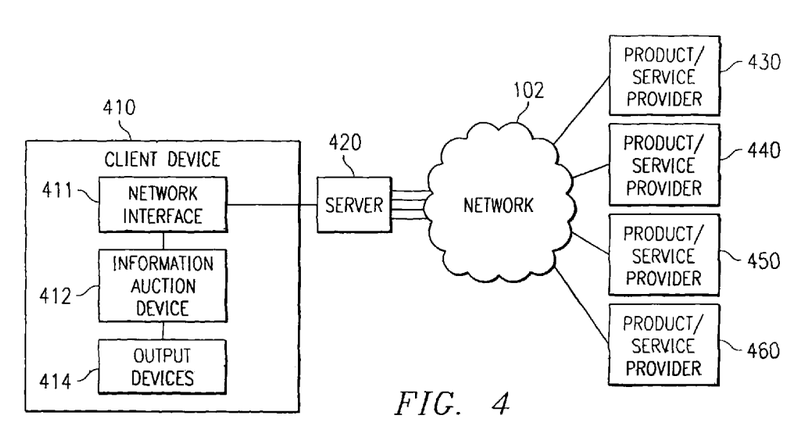
FIG. 4 is an exemplary block diagram illustrating the interaction of the present invention with a plurality of product/service providers via a network.

FIG. 4 is an exemplary block diagram illustrating the interaction of a client device with a plurality of product/service providers via a network. As shown in FIG. 4, the client device 410 includes a network interface 411, an information auction device 412, and output devices 414.

In order to gain access to the network 102, the client device 410 logs onto server 420 which provides a gateway to the network 102. In the particular example shown in FIG. 4, and for purposes of illustration, the network 102 may be the Internet and server 420 may be an Internet Service Provider (ISP) server with which the client device 410 has established a service account.

The client device 410 may "surf" the network 102 using a browser application, such as Microsoft Internet Explorer™ or Netscape Navigator™, as is generally known in the art. The information auction device 412 of the client device 410 may be implemented in software as a plugin to the browser application, as an applet downloaded from the server 420, or some other server, or as a dedicated hardware device installed in the client device 410. The information auction device 412 operates to broadcast user profile information to one or more product/service providers 430-460 via the network 102, receive bids from the product/service providers 430-460, rank the bids and determine which product/service providers 430-460 are provided commercial space and time on the client device 410 and how much commercial space and time is provided.

In one exemplary embodiment of the present invention, the information auction device 412 broadcasts a request for bids from various product/service provider devices 430-460. The particular product/service provider devices 430-460 may have addresses known to the information auction device 412 in which case the request is sent specifically to each of the known addresses. Alternatively, the broadcast may be random with devices passing the request along from device to device until the request is answered by a product/service provider device 430-460. Moreover, the product/service provider devices 430-460 may be advertisement clearing house devices, which compile advertisements from various product/service providers and provide their advertisements to client devices.

When the product/service providers 430-460 receive the request for bids from the client device 410, the product/service providers 430-460 respond with commercial information identifying, for example, products/services offered by the product/service provider and any incentives being offered by the product/service provider, e.g, discounts, rebates, and the like.

Preferably, the commercial information received from the product/service providers uses a standard protocol such that the commercial information may be parsed to identify the types of products offered and incentives offered. For example, the commercial information may include a header identifying a product/service code, a product/service cost ranking, an incentive type code, a value for the incentive, and the like.

The information auction device 412 receives the responses from the product/service providers 430-460 and filters out those product/service providers 430-460 that do not meet criteria set forth in the user profile information, e.g, do not meet the interests of the particular user. Alternatively, rather than performing the filtering at the client device 410, the user profile information may be broadcast with the request for bids, and the product/service providers 430-460 may determine whether or not to respond based on the user profile information received. Moreover, the responses may be first categorized by industries, e.g., auto, food, and entertainment. Responses in the various industry categories may then be filtered by the user through checkbox selections, for example.

In either case, the product/service providers that are not offering products/services that are of interest to the particular user are eliminated from the ranking of bids. After these product/service providers are filtered out, the remaining commercial information from the product/service providers is ranked in accordance with one or more rule sets.

The rule sets may be defined to provide preference to various types of commercial information and may be modifiable by the user of the client device 410. The rule sets may be established such that, for example, percentage discounts for high cost products are ranked higher than dollar amount discounts on lower cost items, free shipping and handling, free accessories, local proximity (near home), time urgency (last sale day) and the like may be used as an adjustment to the basic rank of the incentive, etc. Based on the rule sets and the commercial information received from the product/service providers 430-460, a score for each product/service provider is calculated. The scores are then compared to determine the highest ranking product/service providers. The highest ranking product/service providers are provided advertising space and time on the client device 410.

The amount of advertising space and time, and even the position of the advertising space, provided to the product/service providers is related to the relative ranking of the product/service provider to other product/service providers that submitted commercial information. The highest ranking product/service provider is provided with the most advertising space and time, and most prominent position, on the client device while the lowest ranking product/service provider may not be provided any advertising space or time. The relative amounts of advertising space and time, and advertising position may be allocated based on set parameters within the information auction device 412 or may be determined based on a predetermined relationship, such as a function of the display size, number of high ranking product/service providers, browser space provided for advertisements, and the like. The allocation of advertising time may include determining a cycle time for the advertisement in relation to cycle times of other advertisements from other product/service providers.

It should be noted that the present invention is described in terms of advertisement space and time with particular emphasis on displayed advertisements. However, the present invention is equally applicable to audio advertisements and streaming video advertisements as well. Furthermore, while the present invention is described with an emphasis on advertisements and commercial information being presented to a user of the client device 410, the invention is not limited to such. Any type of information that is to be presented to a user, and which must vie for space and time to do so with other suppliers of such information, may be used without departing from the spirit and scope of the present invention.

The occurrences that lead to the request being broadcast to the product/service providers 430-460 may be of various types. In one embodiment, when the client device 410 first logs onto server 420, the information auction device 412 may broadcast a request automatically. Alternatively, the user may be prompted to enter information pertaining to the types of products/services that the user wishes to see commercial information about and the request being generated based on the user's response. Moreover, the user may enter information identifying products/services on which he/she wishes to receive commercial information upon boot-up of the client device 410, for example.

In a more elaborate embodiment of the present invention, various sensors may be used to determine the most probable product/service requirements of the user. For example, voice recognition devices may be used to determine words used by the user and, based on a frequency of use, various products/services may be identified as of interest to the user. For example, if the user mentions the words "birthday" and "present" a number of times within a predetermined time period, the information auction device 412 may determine that the user may be interested in purchasing a birthday present via the network 102. In such a case, the user may be presented with a dialog box requesting the user to confirm whether or not he/she wishes to receive information pertaining to birthday presents.

The same functionality may be provided based on typed words. Thus, for example, if the information auction device 412 is coupled to a software sensor that monitors words typed in e-mail messages, if the words "birthday" and "present" are encountered a number of times, the same sort of dialog box as described above may be provided to the user.

In an even more sophisticated embodiment of the present invention, sensors may be provided in association with various containers such that the levels of the containers may be monitored and requests sent out automatically based on the levels falling below a predetermined limit. For example, a sensor may be coupled to a beverage can dispenser. When the number of beverage cans in the dispenser falls below a predetermined number, a request for commercial information regarding sales, discounts, and the like, on canned beverages may be automatically broadcast with the results being presented to a user via a client device.

The present invention may also apply to location aware sensors, such as cellular phones or Global Positioning System (GPS). Location aware sensors inform product/service providers user locations, thereby leveraging spatial proximity. For example, when the fuel tank is running low, a request may be transmitted out through the wireless network interface to nearby gas stations to solicit gasoline discounts.

With such systems, the sensors must be coupled to the client device 410 via communication links such that the sensor values from the sensors are transmitted to the information auction device 412. Such communication links may be wired or wireless and may include the network 102. The sensed values are then compared to threshold limits stored in the information auction device 412 and a request for commercial information is broadcast when the sensed values fall below the threshold limits for the product/service monitored by the sensor.

Thus, the present invention provides a mechanism by which a request for commercial information may be broadcast to a plurality of product/service providers and their responses may be ranked based on the incentives offered by the various product/service providers. Based on the ranking of the product/service providers, space and time on the client device may be allocated. The commercial information from the product/service providers may then be received by the client device and presented in accordance with the allocated space and time.

It is noted that the aforementioned process illustrated in FIG. 4 may consist of multiple rounds of bidding and negotiations. The ranking of the responses may be distributed to all or selected product/service providers. These providers may elect to use the knowledge to raise and re-submit their offers. The many rounds of bidding may be terminated when a deadline is reached or the providers stop raising their offers.

Figure 5:
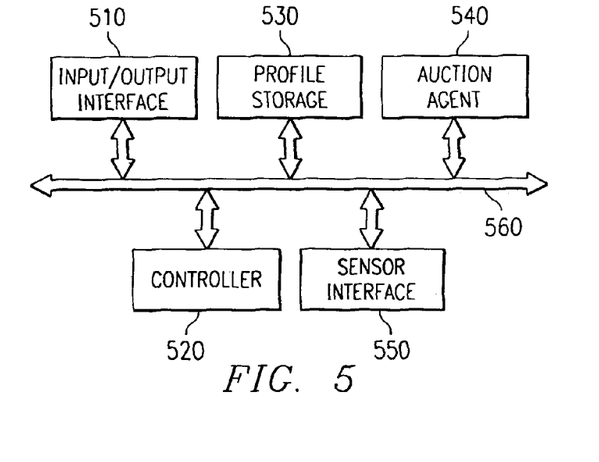
FIG. 5 is an exemplary block diagram illustrating an information auction device in accordance with the present invention.

FIG. 5 is an exemplary block diagram illustrating some of the major components of the information auction device 410. As shown in FIG. 5, the information auction device includes an input/output interface 510, a controller 520, a profile storage 530, an auction agent 540, and a sensor interface 550. These components are coupled to one another via the control/signal bus 560. The components 510-550 may be implemented in hardware, software, or a combination of hardware and software. Although a bus architecture is show in FIG. 5, any type of connection for coupling the components 510-550 may be used without departing from the spirit and scope of the present invention.

The input/output interface 510 sends and receives data from and to the information auction device 412. The controller 520 controls the overall operation of the information auction device 412 by routing information from the input/output interface 510, the profile storage 530, and the sensor interface 550 to the auction agent 540 and performing other managerial functions to oversee the operation of the information auction device 412.

In addition, the controller 520 generates request messages that are broadcast to the product/service providers. Thus, the controller 520 also determines if a request for commercial information should be broadcast, formats the request and transmits the request via the input/output interface 510 and the network interface 411. The determination as to whether a request should be transmitted may be based on sensor values obtained from sensors via the sensor interface 550 as compared to minimum thresholds, number of times of use of a text or spoken word, and the like. As mentioned above, the request may include profile information obtained from the profile storage device 530.

The profile storage 530 stores profile information for one or more users associated with the client device. The profile information may include, for example, demographic information as well as personal preferences for products and services and immediate product/service desires. Thus, for example, a user profile may include a user name, address, telephone number, age, gender, income, marital status, hobby identifiers, and indicators of particular product types that the user is currently interested in obtaining information about. This information may be entered via the client device and stored in the profile storage 530 via the input/output interface 510.

The sensor interface 550 provides a communication interface through which data from the sensors maybe transmitted to the controller 520 for use in determining whether or not to issue a request for commercial information from product/service providers. The sensor interface 550 is not a required component of the information auction device 412 but is rather only included for completeness. Thus, if an embodiment is used in which there are no sensors, the sensor interface 550 may be omitted.

The auction agent 540 operates to determine the ranking of received commercial information, the amount of space and time, and position, allocated to a product/service provider based on the ranking, and instructs the browser/application with which the information auction device 410 operates, to provide the determined allocation of space, time and position for the commercial information. The auction agent 540 performs the auction functions described above with regard to FIG. 4.

Figure 6:
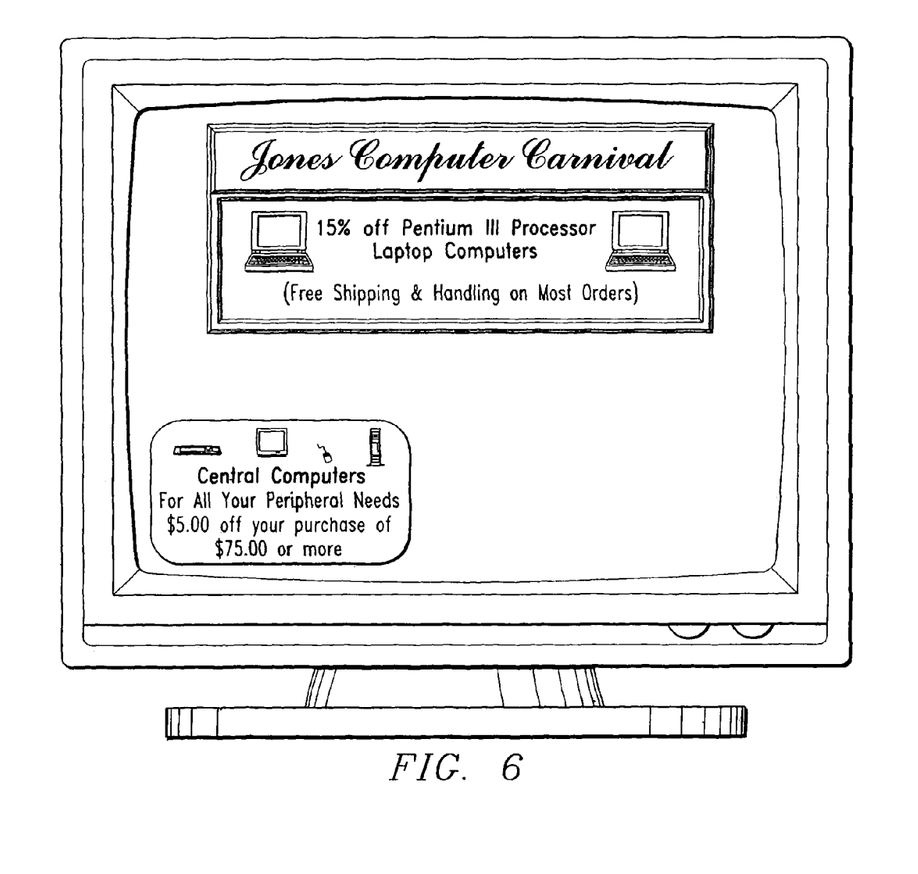
FIG. 6 is an exemplary diagram illustrating a client device display in accordance with the present invention.

FIG. 6 is an exemplary diagram illustrating the various advertising space allocations available to product/service providers based on the ranking mechanism described above. The display shown in FIG. 6 is the result of a request broadcast to product/service providers of computer equipment in a local geographic area in which the user of the client device resides. The results include Jones Computer Carnival and Central Computers. Jones Computer Carnival is ranked higher than Central Computers because Jones is providing a 15% discount on a laptop computer while Central Computers is only providing $15.00 off a purchase of $75.00 or more. 15% of a much costlier item, such as a laptop, will likely be much more valuable to the user than a $15.00 rebate on a $75.00 purchase thus, Jones is provided with a much large advertising area and more prominent position on the display. Central Computers is relegated to the lower left corner, a much less prominent portion of the display, and is given a much smaller area in which to display their advertisement.

In addition, the Jones Computer Carnival advertisement may have audio data that is output to the user while any audio output association with Central Computers may not be output to the user. Likewise, the Central Computers advertisement maybe removed from the display earlier than the Jones Computer Carnival advertisement. Any other methods of providing a preference to the Jones Computer Carnival advertisement over the Central Computers advertisement may be used without departing from the spirit and scope of the present invention.

Figures 7, 8:
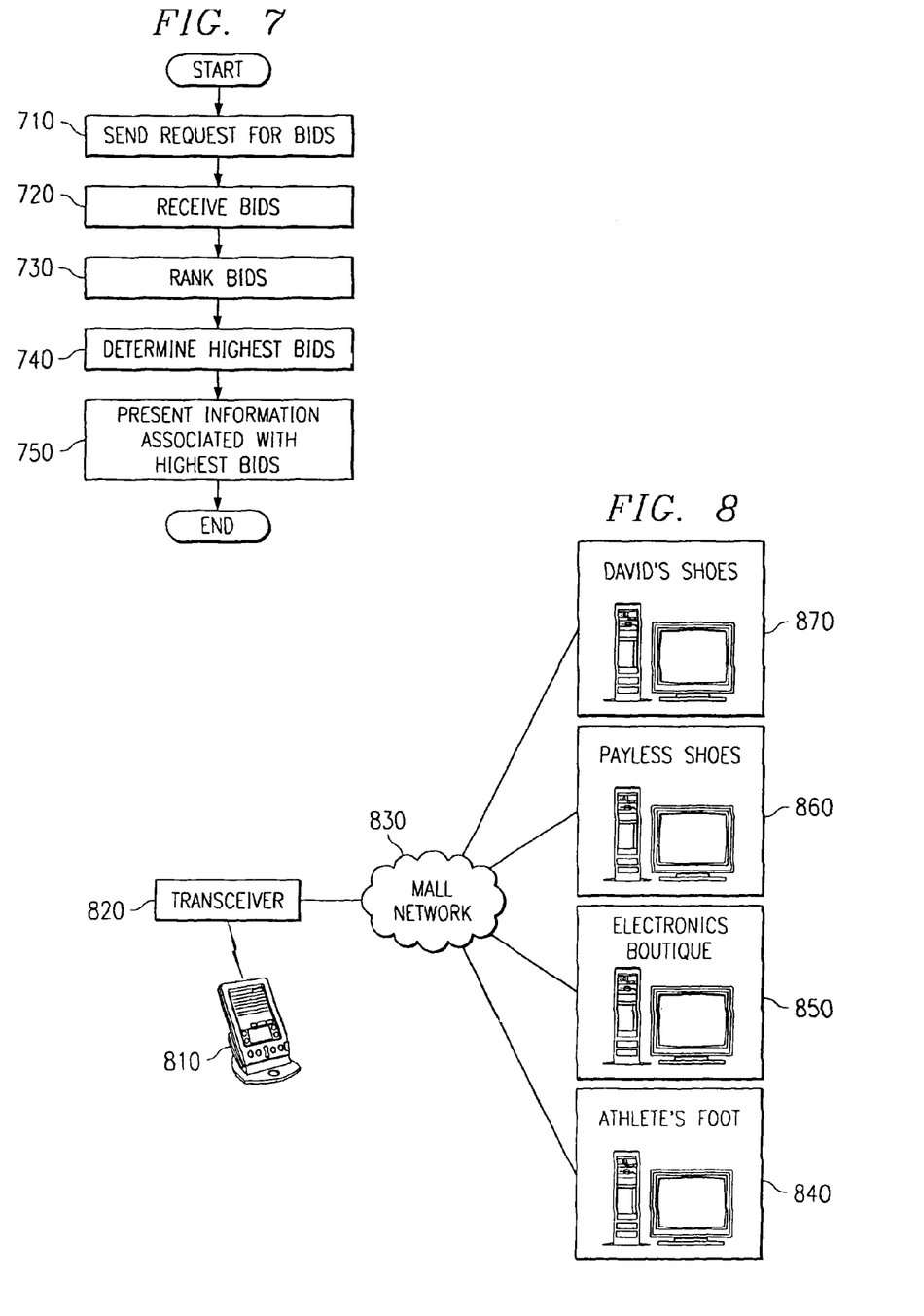
FIG. 7 is a flowchart outlining an exemplary operation of the present invention.
FIG. 8 is an exemplary block diagram illustrating one preferred implementation of the present invention.

FIG. 7 is a flowchart outlining an exemplary operation of the present invention. As shown in FIG. 7, the operation starts with the sending of a request for bids, i.e. commercial information from product/service providers (step 710). As mentioned above, any number of occurrences may be used to determine when to issue the request for bids including, automatically upon boot-up or logon to the server, when a sensed value falls below a determined threshold, when a user is prompted, and the like.

The various bids are then received from the product/service providers (step 720). The bids are ranked (step 730) and the highest bids are determined (step 740). The ranking of the bids may be determined based on the various factors described above. A rule set may be used to help in determining appropriate rankings of commercial information (bids) obtained from the various product/service providers.

The highest bids are then presented to the user via the client device (step 750). The presentation is made in accordance with the ranking of the bids such that higher ranked bids are provided larger advertising space, greater advertising time and a more prominent position on the client device's display. The operation then ends.

As noted above, the present invention may involve multiple rounds of bidding in which the ranking of bids from the various product/service providers may be shared with other product/service providers who are then given an opportunity to increase their bid. In such an embodiment, the operation outlined in FIG. 7 may be performed multiple times until a stop condition is encountered or none of the product/service providers elect to increase their bid.

FIG. 8 provides a block diagram of an exemplary implementation of the present invention. In the exemplary implementation, the present invention is embodied as software in a personal digital assistant 810. The personal digital assistant 810 operates with a shopping mall network to obtain advertisement information from various shops within the shopping mall.

When the user enters the shopping mall entrance, the personal digital assistant 810 sends a request for commercial information to the transceiver 820. The sending of the request may be made in response to a command received by the user of the personal digital assistant 810, in response to receiving a broadcast signal from the transceiver 820, or the like.

The request sent from the personal digital assistant 810 may include information identifying products/services which the user is interested in purchasing during his/her visit to the shopping mall. This information may be obtained from user profile information stored in the personal digital assistant 810, a shopping list prepared by the user and stored in the personal digital assistant 810, or the like. In the particular example shown in FIG. 8, the user is assumed to be interested in purchasing shoes.

In response to receiving the request from the personal digital assistant 810, the various product/service provider systems 840-870 determine whether or not to respond to the request. Since "Electronics Boutique" does not sell shoes, the "Electronics Boutique" system 850 does not respond to the request. The other systems 840 and 860-870 respond with their current commercial sale information since they are each in the business of selling shoes.

The commercial sale information is received by the personal digital assistant 810 via the network 830 and the transceiver 820. The personal digital assistant 810 ranks the commercial sale information and retrieves the advertisement information from the highest ranking product/service provider systems. The advertisement information is then displayed in accordance with the rankings of the commercial sale information on the personal digital assistant's display.

A user may select one or more of the advertisements displayed to him in the manner described above and may be presented with information on how to travel to the associated shop in the shopping mall. This information may be downloaded to the personal digital assistant from a central shopping mall server, for example, in response to a selection of an advertisement. The travel information may include, for example, a map of the shopping mall with a path traced from the current transceiver 820 position to the shop.

Thus, the present invention provides a mechanism by which a user may obtain advertisement and other commercial information of interest in accordance with the maximum financial benefit to the user. With the present invention, advertisers, i.e. product/service providers, are ranked based on the financial incentives offered to the user of the client device and provided with advertising space, time and position in accordance with their ranking. Thus, the present invention provides an incentive for product/service providers to offer competitive discounts, rebates, and such in order to obtain access to potential customers via advertising space and time on the customers' client devices.

While the preferred embodiments of the present invention are described in terms of a client device performing the functions of auctioning display space/time/position, as noted above, the actual auctioning functions may be performed remotely from the client device, such as in a server of a network, or the like. Furthermore, with the use of remotely located auction servers, the auction servers may act as a "market maker" that matches a user profile with provider bids in the manner detailed above. Thus, the auction server may send out requests for commercial information to product/service providers and determine matches between user profiles and the commercial information received. The auction server may further determine rankings of the commercial information received and send the highest ranking commercial information to the client device for presentation to the user.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of presenting information via a digital device having presentation resources, comprising:
sending a request for profile information to a user of the digital device;
receiving profile information directed to products and services of interest to the user;
receiving bids for the presentation resources of the digital device from a plurality of product/service providers, wherein each bid identifies a monetary benefit, associated with a product/service of a given product/service provider, offered to the user of the digital device;
ranking the bids based on an amount of the monetary benefit offered to the user;

filtering out bids from product/service providers that are not offering a product/service of interest to the user based on the profile information;

responsive to filtering out bids from product/service providers that are not offering a product/service of interest to the user; re-ranking the bids from product/service providers that are offering a product/service of interest to the user to form re-ranked bids;

apportioning the presentation resources of the digital device in accordance with the re-ranked bids; and presenting information for at least one of the plurality of product/service providers using the apportioned presentation resources.

2. A method of presenting information via a digital device, comprising:

sending a request for profile information to a user of the digital device;

receiving profile information directed to products and services of interest to the user and a number of user preferences regarding the products and services of interest to the user, wherein the number of user preferences comprise a proximity preference for a provider of the products and services to a location of the user and a type of discount preference;

transmitting a request for information from at least one product/service provider;

filtering out information from product/service providers that are not offering a product/service of interest to the user based on the profile information;

receiving the information from the at least one product/service provider, the information identifying a benefit, associated with a product/service of the at least one product/service provider, offered to the user of the digital device;

ranking the information based on the benefit offered to the user and the number of user preferences; and presenting the information via the digital device in accordance with the ranking of the information such that higher ranking information is presented more prominently than lower ranking information.

3. The method of claim 2, wherein filtering out unwanted information from product/service providers includes determining if the information from the product/service providers meets criteria in a user profile.

4. The method of claim 2, wherein filtering out unwanted information from product/service providers includes receiving a user selection of unwanted product/service provider groups.

5. The method of claim 1, wherein each bid includes one or more of product/service identification information and an incentive to buyers of a product/service.

6. The method of claim 1, wherein the benefit to the user is at least one of a discount, a rebate, free shipping and handling, free accessories, proximity to the user, and time urgency.

7. The method of claim 1, wherein each bid includes one or more of a product/service code, a product/service cost ranking, an incentive type code, and a value for the incentive.

8. The method of claim 1, wherein ranking the bids based on the benefit offered to the user includes ranking the bids based on one or more rule sets.

9. The method of claim 1, wherein the digital device includes a display, wherein the presentation resources include display space on the display, and wherein apportioning the presentation resources of the digital device in accordance with the ranking of the bids includes allocating a portion of the display space on the digital device in accordance with the ranking of the bids.

10. The method of claim 1, wherein the presentation resources include presentation time and wherein apportioning the presentation resources of the digital device in accordance with the ranking of the bids includes allocating presentation time on the digital device in accordance with the ranking of the bids.

11. The method of claim 1, wherein the digital device includes a display, wherein the presentation resources include display space on the display, and wherein apportioning the presentation resources of the digital device in accordance with the ranking of the bids includes allocating a display position within the display space in accordance with the ranking of the bids.

12. The method of claim 2, wherein transmitting the request is performed in response to one of logging on to a network server, booting-up the digital device, receiving an input to a user prompt, and receiving an input from a sensor.

13. The method of claim 2, wherein transmitting the request is performed in response to an occurrence of an event as determined based on sensor input.

14. The method of claim 13, wherein the sensor input includes one or more of keyboard input, audio input, input representing a measured quantity of a container, and location awareness sensor input.

15. The method of claim 13, wherein the occurrence of an event is determined based on a comparison of the sensor input to one or more threshold limits.

16. A system for presenting information via a presentation device having presentation resources, comprising:

a network interface for sending a request for profile information to a user, receiving profile information directed to products and services of interest to a user, and receiving bids for the presentation resources from a plurality of product/service providers, wherein each bid identifies a monetary benefit, associated with a product/service of a given product/service provider, offered to the user;

an auction device that ranks the bids based on an amount of the monetary benefit offered to the user, filters out bids from product/service providers that are not offering a product/service of interest to the user based on the profile information, re-ranks the bids from product/service providers that are offering a product/service of interest to the user to form re-ranked bids, and apportions the presentation resources in accordance with the re-ranked bids; and a presentation device that presents information for at least one of the plurality of product/service providers using the apportioned presentation resources.

17. A system for presenting information, comprising:

a network interface for sending a request for profile information to a user and receiving profile information directed to products and services of interest to the user and a number of user preferences regarding the products and services of interest to the user, wherein the number of user preferences comprise a proximity preference for a provider of the products and services to a location of the user and a type of discount preference;

a transmitter for transmitting a request for information from at least one product/service provider;

a filter for filtering out information from product/service providers that are not offering a product/service of interest to the user based on the profile information;

a network interface for receiving the information from the at least one product/service provider, the information identifying a benefit, associated with a product/service of the at least one product/service provider, offered to the user;

an auction device that ranks the information based on the benefit offered to the user and the number of user preferences; and a display device that presents the information in accordance with the ranking of the information such that higher ranking information is presented more prominently than lower ranking information.

18. The system of claim 17, wherein the filter determines if the information from the product/service providers meets criteria in a user profile.

19. The system of claim 17, wherein the filter receiving a user selection of unwanted product/service provider groups.

20. The system of claim 16, wherein each bid includes one or more of product/service identification information and an incentive to buyers of a product/service.

21. The system of claim 16, wherein the benefit to the user is at least one of a discount, a rebate, free shipping and handling, free accessories, proximity to the user, and time urgency.

22. The system of claim 16, wherein each bid includes one or more of a product/service code, a product/service cost ranking, an incentive type code, and a value for the incentive.

23. The system of claim 16, wherein the auction device ranks the bids based on one or more rule sets.

24. The system of claim 16, wherein the presentation device includes a display,
wherein the presentation resources include display space on the display, and
wherein the auction device allocates a portion of the display space in accordance with the ranking of the bids.

25. The system of claim 16, wherein the presentation resources include presentation time and wherein the auction device allocates presentation time in accordance with the ranking of the bids.

26. The system of claim 16, wherein the presentation device includes a display,
wherein the presentation resources include display space on the display, and
wherein the auction device allocates a display position within the display space in accordance with the ranking of the bids.

27. The system of claim 17, wherein the transmitter transmits the request in response to one of logging on to a network server, booting-up the digital device, receiving an input to a user prompt, and receiving an input from a sensor.

28. The system of claim 17, wherein the transmitter transmits the request in response to an occurrence of an event as determined based on sensor input.

29. The system of claim 28, wherein the sensor input includes one or more of keyboard input, audio input, input representing a measured quantity of a container, and location awareness sensor input.

30. The system of claim 28, wherein the occurrence of an event is determined based on a comparison of the sensor input to one or more threshold limits.

31. The system of claim 16, wherein the auction device and the presentation device are remotely located from one another.

32. A computer program product in a computer readable storage medium for presenting information via a digital device having presentation resources, the computer program product comprising:
instructions for sending a request for profile information to a user of the digital device;
instructions for receiving profile information directed to products and services of interest to the user;
instructions for receiving bids for the presentation resources of the digital device from a plurality of product/service providers, wherein each bid identifies an monetary benefit, associated with a product/service of the a given product/service provider, offered to the user of the digital device;
instructions for ranking the bids based on an amount of the monetary benefit offered to the user;
instructions for filtering out bids from product/service providers that are not offering a product/service of interest to the user based on the profile information;
instructions for re-ranking the bids from product/service providers that are offering a product/service of interest to the user to form re-ranked bids in response to filtering out bids from product/service providers that are not offering a product/service of interest to the user;
instructions for apportioning the presentation resources of the digital device in accordance with the re-ranked bids; and
instructions for presenting information for at least one of the plurality of product/service providers using the apportioned presentation resources.

33. A computer program product in a computer readable storage medium for presenting information via a digital device, the computer program product comprising:
instructions for sending a request for profile information to a user of the digital device;
instructions for receiving profile information directed to products and services of interest to the user and a number of user preferences regarding the products and services of interest to the user, wherein the number of user preferences comprise a proximity preference for a provider of the products and services to a location of the user and a type of discount preference;
instructions for transmitting a request for information from at least one product/service provider;
instructions for filtering out information from product/service providers that are not offering a product/service of interest to the user based on the profile information;
instructions for receiving information from at least one product/service provider, the information identifying an benefit, associated with a product/service of the at least one product/service provider, offered to the user of the digital device;
instructions for ranking the information based on the benefit offered to the user and the number of user preferences; and
instructions for presenting the information via the digital device in accordance with the ranking of the information such that higher ranking information is presented more prominently than lower ranking information.

34. The computer program product of claim 32, wherein the instructions for ranking the bids based on the benefit offered to the user includes instructions for ranking the bids based on one or more rule sets.

35. The computer program product of claim 32, wherein the digital device includes a display,
wherein the presentation resources include display space on the display, and
wherein the instructions for apportioning the presentation resources of the digital device in accordance with the ranking of the bids includes instructions for allocating a portion of the display space on the digital device in accordance with the ranking of the bids.

36. The computer program product of claim 32, wherein the presentation resources include presentation time and wherein the instructions for apportioning the presentation resources of the digital device in accordance with the ranking of the bids includes instructions for allocating presentation time on the digital device in accordance with the ranking of the bids.

37. The computer program product of claim 32, wherein the digital device includes a display,
wherein the presentation resources include display space on the display, and
wherein the instructions for apportioning the presentation resources of the digital device in accordance with the ranking of the bids includes instructions for allocating a display position within the display space in accordance with the ranking of the bids.

38. The computer program product of claim 33, wherein the instructions for transmitting the request are executed in response to an occurrence of an event as determined based on sensor input.

39. The computer program product of claim 38, wherein the sensor input includes one or more of keyboard input, audio input, input representing a measured quantity of a container, and location awareness sensor input.

40. The computer program product of claim 38, wherein the occurrence of an event is determined based on a comparison of the sensor input to one or more threshold limits.

41. The method of claim 1, wherein higher ranking bids are apportioned more presentation resources than lower ranking bids.

42. The system of claim 16, wherein higher ranking bids are apportioned more presentation resources than lower ranking bids.

43. The computer program product of claim 32, wherein higher ranking bids are apportioned more presentation resources than lower ranking bids.

44. A method of presenting information via a digital device having presentation resources, comprising:
sending a request for profile information to a user of the digital device;
receiving profile information directed to products and services of interest to the user;
receiving information from at least one product/service provider, the information identifying a monetary benefit, associated with a product/service of the at least one product/service provider, offered to the user of the digital device;
ranking the information based on an amount of the monetary benefit offered to the user;
filtering out information from product/service providers that are not offering a product/service of interest to the user based on the profile information;
responsive to filtering out information from product/service providers that are not offering a product/service of interest to the user, re-ranking the information from product/service providers that are offering a product/service of interest to the user to form re-ranked information;
apportioning an amount of the presentation resources of the digital device in accordance with the re-ranked information such that higher ranking information is apportioned more presentation resources than lower ranking information; and
presenting the information for the at least one of the plurality of product/service providers using the apportioned presentation resources.

45. The method of claim 44, wherein the presentation resources include at least one of display space, display duration, and audio duration.

* * * * *